April 20, 1954   N. FIENBERG ET AL   2,675,584
MOLD FEEDING APPARATUS

Filed July 24, 1950   4 Sheets-Sheet 1

Inventors
N. Fienberg
A. R. Calder

April 20, 1954  N. FIENBERG ET AL  2,675,584
MOLD FEEDING APPARATUS
Filed July 24, 1950  4 Sheets-Sheet 4

Inventors
N. Fienberg
A. R. Calder
By Glover & Downing Tuttle
Attys.

Patented Apr. 20, 1954

2,675,584

UNITED STATES PATENT OFFICE 2,675,584

MOLD FEEDING APPARATUS

Nathan Fienberg, Caulfield, Victoria, and Alan Reginald Calder, Newport, Victoria, Australia, assignors to A. C. I. Plastics Proprietary Limited, Melbourne, Victoria, Australia, a company Application July 24, 1950, Serial No. 175,632

Claims priority, application Australia July 25, 1949

6 Claims. (Cl. 18—30)

This invention relates to the feeding of measured quantities of moulding powder and the like to moulds and its object is to provide improved means therefor.

The invention resides broadly in measuring and feeding mechanism comprising a substantially horizontal table provided with a mould cavity, a feed member arranged above and movable parallel to said table, a measuring compartment extending through said feed member from the upper surface thereof to the surface of the table, supply means arranged above the feed member at one side of said mould cavity and means operable to actuate said feed member whereby the said measuring compartment is successively moved into register with said supply means to receive a measured charge of moulding powder or the like and then into register with said mould cavity to deposit the said measured charge thereinto.

Preferably the said feed member is arranged to be moved backwards and forwards between the said powder receiving and discharge positions for which purpose same is preferably supported for angular movements about a vertical axis.

The said feed member is preferably adjustable towards and from said table to vary the volume of said measuring compartment and adjustable means are provided for maintaining substantial sliding contact between the table and the lower surface of said feed member.

Reference is had to our copending application Serial Number 175,633, filed on July 25, 1950 and Patent No. 2,568,956, dated September 25, 1951, and Patent No. 2,621,363, dated December 16, 1952.

Figure 1:
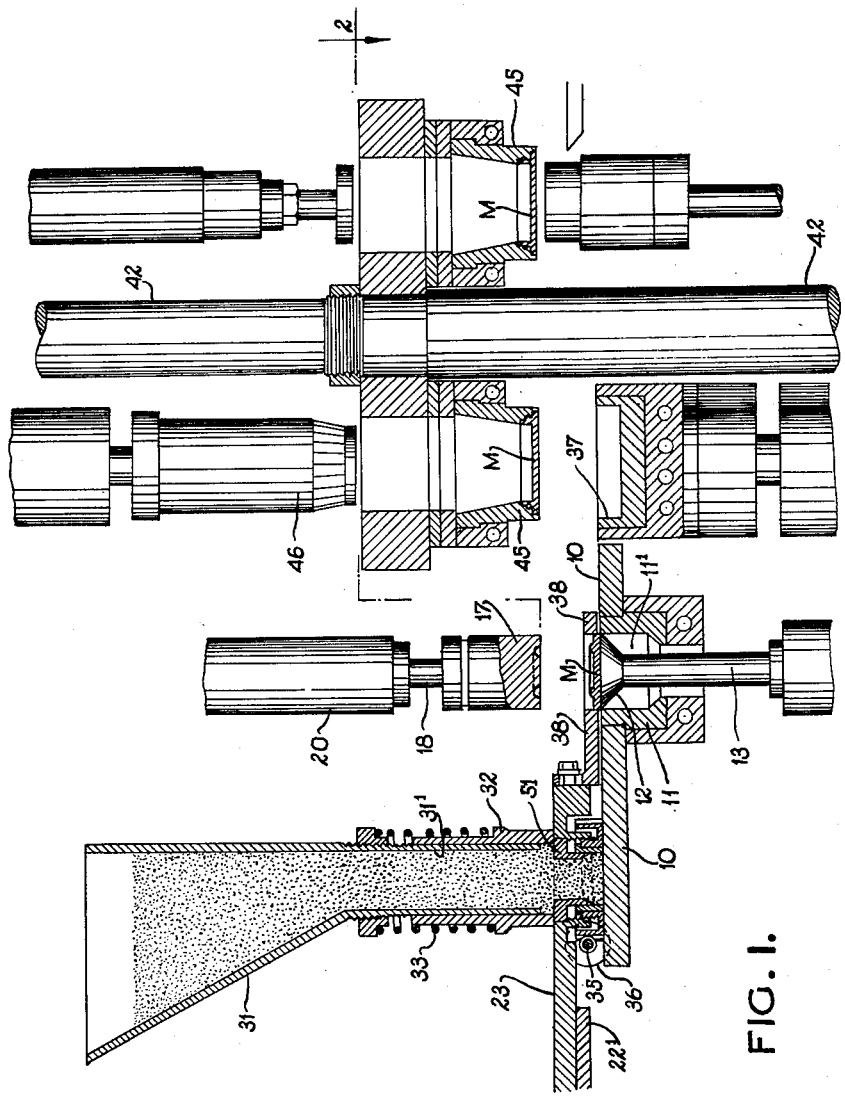
Figure 2:
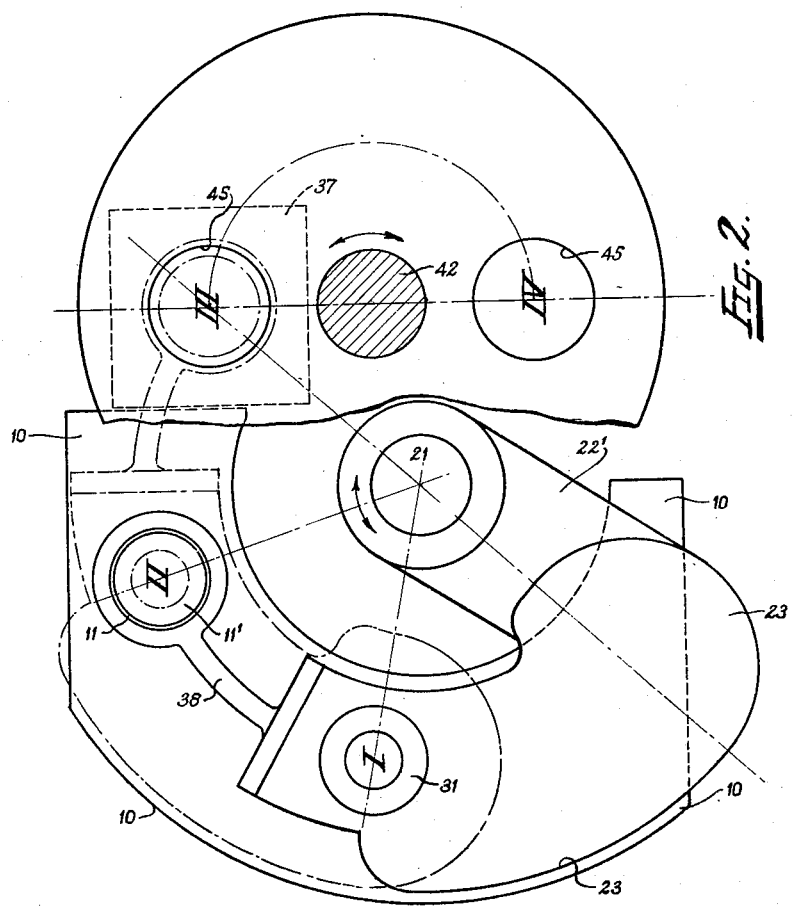
Figure 3:
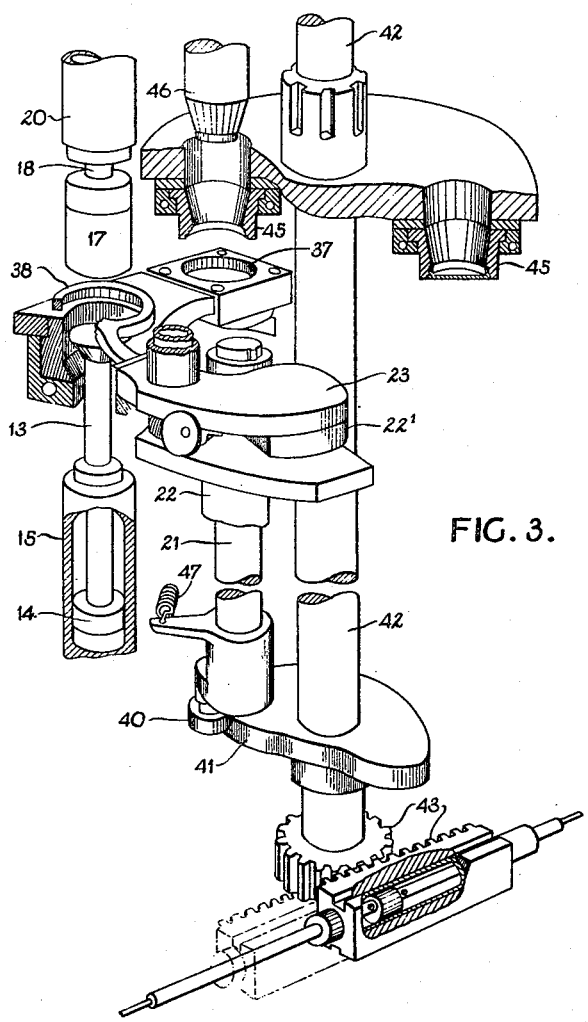
Figure 4:
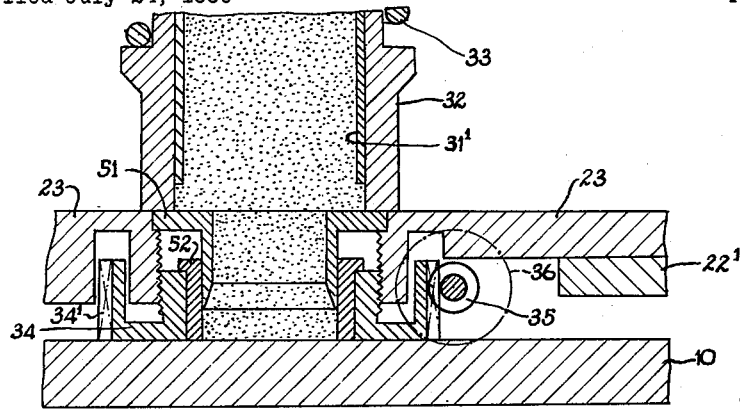
Figure 5:
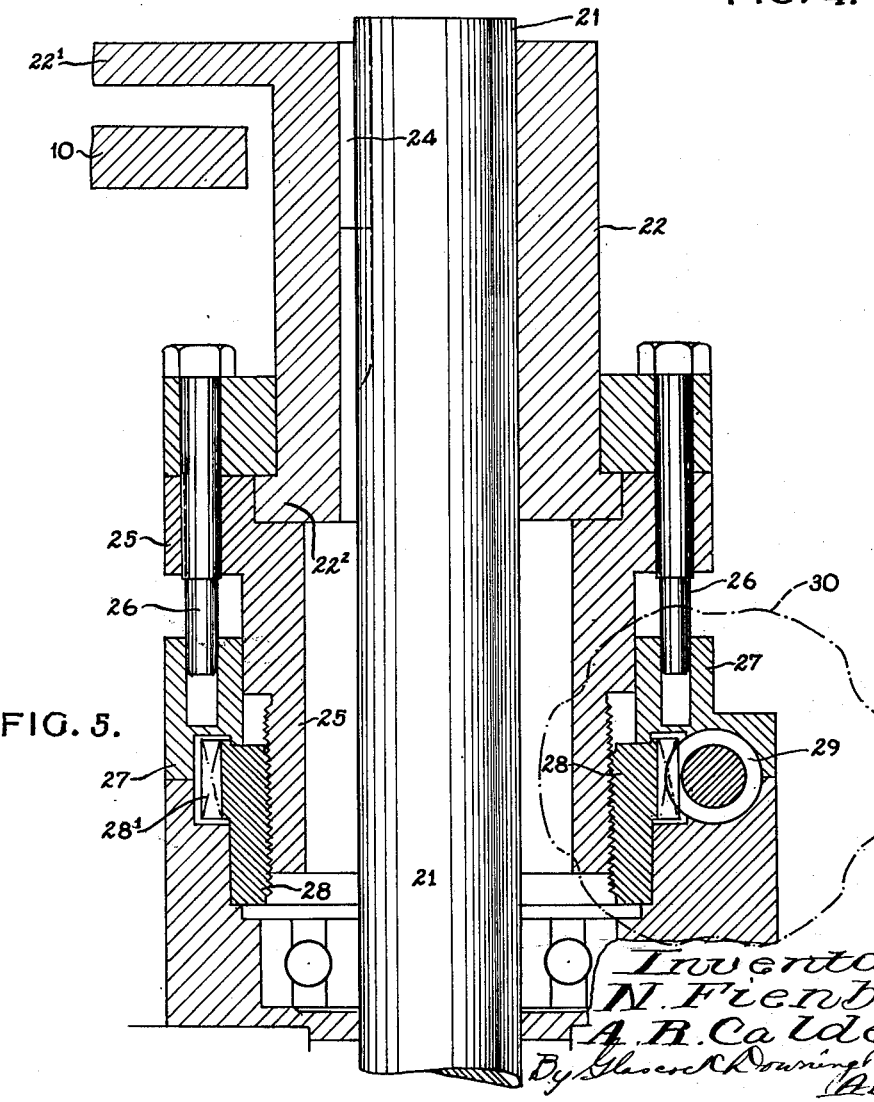

For a more particular description of the preferred form of the invention, reference will be made to the accompanying drawings, wherein:

Figure 1 is a developed view in sectional elevation of a measuring and feeding mechanism and appurtenant parts, Figure 2 is a view in plan showing the several stations in their correct relative positions, Figure 3 is a perspective view of the apparatus, Figure 4 is a sectional view to a larger scale of a portion of the device shown in Figure 1, and Figure 5 is a view in sectional elevation of raising and lower means.

The illustrated moulding machine comprises a fixed horizontal table 10 in which is mounted a mould member 11 formed with a cavity 11' the upper surface of the mould being flush with the surface of the table, so as to form a smooth continuation thereof. The bottom of the mould cavity or the central portion thereof is formed by an ejector head 12 on the upper end of a reciprocable rod 13 secured to a plunger 14 which operates in a fixed double acting hydraulic cylinder 15. Thus by operation of the plunger, the moulded articles M are ejected at the completion of each moulding operation as hereafter described.

The said mould 11 may constitute the lower element of a final mould but in the particular machine shown in the drawings it forms the lower member of a preliminary mould in which a partly polymerised pre-shape M is formed for subsequent transfer to the lower member 37 of a final mould.

A vertically reciprocable pressing plug or male mould member is arranged directly above the cavity 11' of the preliminary mould and is secured to the lower end of a plunger rod 18 fitted with a plunger which operates in a second double-acting hydraulic cylinder 20.

An oscillatable vertical rock shaft 21 supported in suitable bearings and disposed adjacent to the said mould 11 is fitted with a sleeve 22 having an integral radial arm 22' and this arm is provided adjacent its outer end with a laterally projecting horizontal feed blade 23 which extends above the said table.

The sleeve 22 is constrained to turn in unison with the spindle 21 but is adjustable axially thereon, in order that the said feed blade 23 may be raised and lowered relatively to the table.

For this purpose and as shown in Figure 5 the sleeve 22 is slidable on a key 24 fitted to the rock shaft 21 and its lower end is formed with a peripheral flange 22² which is connected as shown to the upper end of a vertically adjustable member 25 so that said sleeve is free to turn but is constrained to move vertically with the member 25.

The member 25 is restrained against vertical movements by guide pins 26 which extend into holes in a fixed casing 27 and the lower end portions of such member 25 is screw-threaded externally and is engaged by a nut 28 provided at its outer periphery with worm teeth 28' such nut being free to rotate but being restrained by the casing 27 against axial movements.

The worm teeth 28' are in constant mesh with a worm 29 fitted with an operating knob 30, so that by actuating the latter the feed blade 23 may be raised and lowered while the machine is operating.

The blade is provided in its free end portion with a replaceable vertically disposed bush 51, the lower end portion of which is received within a vertically adjustable adaptor sleeve 52 and the lower end of the latter is maintained substantially in sliding contact with the surface of the table 10. The bush and adaptor sleeve thus coact to form a vertically disposed measuring compartment which is normally closed at its lower end by the surface of the table 10.

When the rock shaft 21 and feed blade 23 thereon occupy their normal retracted positions shown in Figures 1 and 2 the said measuring compartment is disposed in register with the lower end of a vertical discharge tube 31' which depends from a hopper 31 containing moulding powder, whereby as the said measuring compartment returns to its normal position after each forward movement thereof, it is automatically filled with moulding powder.

The lower end of the said discharge tube 31' is disposed clear of the upper surface of the feed blade but a sealing sleeve 32 slidably mounted on said tube is maintained in sliding contact with the feed blade by a compression spring 33 so that escape of powder therebetween is avoided.

The mould 11 is disposed on the arc of movement of the measuring compartment in the feed blade 23 and when the latter is moved to the limit of its forward movement, said compartment is disposed in register with the mould cavity, so that the measured charge of moulding powder is deposited in the latter.

It will also be evident that as the measuring compartment moves forwardly out of register with the delivery spout of the powder hopper, the lower end of the sealing sleeve 32 is closed by the plane surface of the feed blade and that such closure is maintained until the latter is returned to its normal retracted position.

The volume of the said powder measuring compartment is capable of regulation to suit the requirements of the particular article to be moulded and thus enable the amount of flash to be reduced to the minimum, such regulation being effected by raising or lowering the feed blade 23 in the manner previously described.

It will be evident that when the feed blade is raised or lowered a consequential relative adjustment of the adaptor sleeve 52 is necessary and for this purpose such sleeve may be maintained in sliding contact with the table by a suitably arranged spring.

Preferably, however, and as shown in the drawings the adaptor sleeve 32 is supported on an annular rotatable carrier 34 which has a screw-threaded engagement with a socket formed in the undersurface of the feed blade as best shown in Figure 4.

The outer peripheral portion of this carrier is formed with worm teeth 34' and is constantly engaged by a worm 35 rotatively supported on the feed blade and provided with an operating knob 36.

In the moulding machine illustrated in the drawings, the moulding M produced in the mould 11 is a partly polymerised pre-shape for subsequent transfer to the lower member 37 of final mould, the axis of which is also arranged at the same radial distance from the spindle 21 as the preliminary mould 11.

The lower mould member 37 is arranged to be raised and lowered by a hydraulic cylinder or otherwise and when same occupies its normal lowermost position, its upper surface is flush with and so forms a smooth continuation of the upper surface of the fixed table 10.

The transfer of the pre-shape M from the preliminary mould 11 to the final mould 37 is effected by sliding same along the table 10.

For this purpose the forward end of the feed blade 23 is fitted with a forwardly extending transfer arm 38 formed in its free end with a relatively large circular opening which is in register with the mould 11 when the feed blade occupies its normal retracted position and which registers with the final mould 37 when said feed blade is disposed at the limit of its forward movement.

Thus during the operation of moulding the pre-shape M the pressing plug 17 descends through the opening in the transfer arm 38 and when such plug is returning to its normal elevated position the ejector 12 is raised, so that the moulding is located within the hole in the transfer arm with its lower surface substantially flush with the upper surface of the table.

Accordingly as the feed blade undergoes its next forward movement to deliver another measured charge of moulding powder to the mould 11, the moulding M is transferred simultaneously to the final mould 37.

The rock shaft 21 may be actuated in any manner appropriate to the arrangement of the machine, in which the feeding mechanism is employed and may be conveniently effected in the manner shown in Figure 3, wherein the lower end of such shaft is fitted with an eccentrically disposed cam follower 40 which is maintained by a spring 47 in engagement with a cam 41 on a second vertical shaft 42 arranged to be moved forwardly and rearwardly through angles of 180° by a rack and pinion mechanism 43.

The upper end portion of the shaft 42 is fitted with a carrier disc which supports a diametrically opposed pair of alternative ring mould elements 45 of the final mould, so that such ring moulds are alternately disposed in register with the lower member 37 of the final mould to co-operate with the latter and with a hydraulically operated plunger 46 also arranged at the final moulding station.

Thus during each actuation of the shaft 42 in either direction, the feed blade is caused to undergo a forward and then a return movement and during such forward movements a measured charge of moulding powder is delivered to the mould 11 and the moulding M formed in the latter during the preceding operation is transferred to the mould 37.

When the shaft 42 completes each movement and a ring mould 45 is located at the moulding position, the preliminary and final moulds are closed simultaneously by means of the respective hydraulic cylinders or otherwise to mould a pre-shape M in the preliminary mould and to form a final moulded article in the final mould.

The adjustable feed means herein described not only enables the quantity of powder to be accurately measured and adjusted, so that the moulded article will have the minimum of flash, but also enables such measured quantities to be rapidly delivered to the mould whereby the speed of operation thereof may be increased.

We claim:

1. Power measuring and feeding apparatus for plastic moulding machines comprising means forming a fixed substantially horizontal table having a mould cavity in its upper surface, a laterally elongated feed member arranged above the surface of the table, said feed member having a plain upper surface disposed parallel to the surface of the table, adaptor means on and depending below the lower surface of said feed member, the lower surface of said adaptor means being disposed parallel to the surface of the table whereby it may be maintained in substantial brushing contact therewith, said feed member and adaptor means having therein a vertical measuring compartment which extends uninterruptedly therethrough from the upper surface of said feed member to the surface of the table, means operable at all times to raise and lower said feed member relatively to the table, means operable to raise and lower said adaptor means relatively to the feed member thereby to vary the depth and capacity of said measuring compartment, means supporting said feed member for angular movements about a substantially vertical axis spaced from said measuring compartment, powder supply means arranged above the feed member and spaced laterally from the mould cavity, said supply means and said mould cavity being disposed on the arc of movement of the measuring compartment, said measuring compartment being normally disposed below and in register with the powder supply means and means operable to impart forward and return angular movements to the feed member whereby the measuring compartment is periodically moved forwards into register with the mould cavity and is then returned into register with the supply means, the lower end of said supply means being closed by the plain upper surface of the feed member except when said measuring compartment is in register therewith.

2. Powder measuring and feeding apparatus for plastic moulding machines comprising a fixed substantially horizontal table having a mould cavity in its upper surface, a laterally elongated feed member arranged above the surface of the table, said feed member having a plain upper surface disposed parallel to the surface of the table, adaptor means mounted for raising and lowering movements on the feed member and having its lower surface disposed below said feed member whereby it may be maintained in substantial sliding contact with the table, said feed member and adaptor means having therein a measuring compartment which extends vertically and uninterruptedly therethrough from the upper surface of said feed member to the surface of the table, means operable to raise and lower said feed member relatively to the table, means operable to raise and lower said adaptor means relatively to the feed member thereby to vary the depth and capacity of said measuring compartment, means supporting said feed member for angular movements about a substantially vertical axis, powder supply means arranged above the feed member and spaced laterally from the mould cavity, a mould member spaced laterally from said mould cavity, and supported for vertical movement relatively to said frame, said mould member having in its upper surface a cavity which is closed at its lower end, and when disposed in its lowermost position having its upper surface substantially flush with and forming a continuation of the upper surface of the table, said supply means, said mould cavity and said mould member being disposed at a common radial distance from said axis of the feed member, said measuring compartment being normally disposed below and in register with the powder supply means, means operable to impart forward and return angular movements to the feed member whereby the measuring compartment is periodically moved forwards into register with the mould cavity and is then returned into register with the supply means, the lower end of said supply means being closed by the plain upper surface of the feed member except when said measuring compartment is in register therewith, ejector means in said first mentioned mould cavity, means operable after a moulding is formed in the said first mentioned mould cavity to actuate said ejector means whereby the moulding is raised above the level of the table and transfer means on and movable in unison with said feed member, said transfer means having its moulding engaging portion disposed in close proximity to said first mentioned mould cavity when said measuring compartment is in register with said powder supply means, whereby as said measuring compartment is moved forwardly into register with said first mentioned mould cavity, the said transfer means engages the moulding previously formed in that cavity and impels same across the table into the cavity in said mould member.

3. Measuring and feeding apparatus comprising a fixed horizontal table provided with an upwardly facing mould cavity, a vertically movable plunger arranged coaxially above the mould cavity to coact therewith, a vertical rock shaft spaced laterally from said mould cavity, a substantially horizontal feed plate arranged somewhat above the table, axially slidable means connecting the feed plate to the rock shaft for unitary oscillation therewith, an adaptor member adjustably mounted on the forward end portion of the feed plate and having its lower surface disposed below said feed plate and normally disposed substantially in contact with the table, said feed plate and adaptor member being formed with a substantially vertical powder measuring compartment which extends uninterruptedly from the upper surface of the feed plate to, and is normally closed by, the upper surface of the table, supply means for powder arranged above the feed plate at a fixed position spaced laterally from the mould cavity, said measuring compartment being normally disposed below and in register with said supply means, means for imparting forward and return angular movements to said rock shaft and feed plate whereby said measuring compartment is moved forwardly into register with the mould cavity and is then returned into register with said supply means, said means connecting said feed plate to the rock shaft including a member rotatively supporting said feed plate for oscillation with said rock shaft, means operable to impart vertical movements to said supporting member thereby to raise and lower said feed plate and means operable to raise and lower said adaptor member relatively to said feed plate thereby to vary the capacity of said measuring compartment.

4. Measuring and feeding apparatus comprising a fixed horizontal table provided in its upper surface with a mould cavity, a vertically movable plunger arranged coaxially above the mould cavity to coact therewith, a vertical rock shaft spaced laterally from said mould cavity, a substantially horizontal feed plate arranged somewhat above the table, axially slidable means connecting said feed plate to the rock shaft for unitary oscillation therewith whereby they are constrained to move angularly in unison, an adaptor member on the forward end portion of the feed plate with its upper end disposed below the upper surface of said feed plate and its lower end disposed below the lower surface thereof, said feed plate and said adaptor member being formed with a substantially vertical powder measuring compartment which extends uninterruptedly from the upper surface of the feed plate to, and is normally closed by, the upper surface of the table, a hopper for moulding material, a depending spout thereon arranged above the feed plate at a position spaced laterally from the mould cavity, a sleeve slidably mounted on said spout, resilient means maintaining said sleeve in sliding contact with the upper surface of the feed plate, said measuring compartment being normally disposed below and in register with said sleeve, means for actuating said rock shaft to impart horizontal forward and return movements to said feed plate whereby said measuring compartment is moved forwardly into register with the mould cavity and is then returned into register with said sleeve, said means connecting said feed plate to the rock shaft including a member rotatively supporting said feed plate, said supporting member being mounted for vertical sliding movement on said rock shaft but restrained against angular movements relative thereto, means operable to raise and lower said supporting member and feed plate relatively to the table and means operable to raise and lower the adaptor member relatively to the feed plate thereby to vary the capacity of said measuring compartment.

5. Measuring and feeding apparatus comprising a fixed horizontal table provided in its upper surface with a mould cavity, a vertically movable plunger arranged coaxially above the mould cavity to coact therewith, a vertical rock shaft spaced laterally from said mould cavity, a substantially horizontal feed plate arranged somewhat above the table, said feed plate being slidably but non-rotatingly mounted on said rock shaft, whereby same are constrained to move angularly in unison, a hopper for moulding material, a discharge spout at the lower end of the hopper, adaptor means on and projecting from the lower surface of the feed plate with its lower surface disposed parallel to the latter, the upper end of said adaptor means being disposed below the upper surface of the feed plate, said feed plate and adaptor means being formed with a powder measuring compartment which extends uninterruptedly from the upper surface of the feed plate to the surface of the table, said measuring compartment being normally disposed below and in register with said discharge spout, coacting screw-threaded means supporting said adaptor means on the feed plate, an actuating member movably supported by the feed plate, transmission means supported on the feed plate and connecting said actuating member to one of said coacting screw-threaded means whereby said adaptor means may be raised and lowered relatively to the feed plate thereby to vary the capacity of said measuring compartment, means for imparting forward and return movements to said rock shaft and said feed plate whereby said compartment is moved forwardly into register with the mould cavity and is then returned into register with said feed spout, a member rotatively supporting said feed plate, said supporting member being mounted for vertical sliding movement on said rock shaft but restrained against angular movements relative thereto, and means operable to raise and lower said supporting member and feed plate relatively to said rock shaft and said table.

6. Measuring and feeding apparatus comprising a fixed horizontal table provided with a mould cavity, a vertically movable plunger arranged coaxially above the mould cavity to coact therewith, a substantially horizontal feed plate arranged somewhat above the table and mounted for angular movements about a vertical axis spaced from said mould cavity, said feed plate being provided adjacent its forward end with a substantially vertical powder measuring compartment which extends from the upper surface of the feed plate to and is normally closed by the upper surface of the table, supply means for powder arranged above the feed plate at a position spaced laterally from the mould cavity, said measuring compartment being normally disposed below and in register with said supply means, means for imparting forward and return movements to said feed plate whereby said measuring compartment is moved forwardly into register with the mould cavity and is then returned into register with said supply means, a further mould member spaced laterally from the aforesaid mould cavity and having a mould cavity in its upper surface, said further mould member being movable vertically whereby prior to each actuation of the feed plate, the upper surface of said mould member is flush with and forms a smooth continuation of the table, an extension on the forward end of the feed plate, such extension being adapted to slide a moulding over the table from the first-mentioned mould cavity to the cavity of said mould member, said extension having its moulding engaging portion disposed in close proximity to said first-mentioned mould cavity when the measuring compartment is in register with said powder supply means and means operable prior to each operation of the feed plate, to eject upwardly the moulding formed in said first-mentioned mould cavity whereby same is disposed in the path of movement of the said extension and is then impelled by the latter over the table and into the cavity of said mould member.

References Cited in the file of this patent

UNITED STATES PATENTS

| Number | Name | Date |
|--------|------|------|
| 566,105 | Whittaker | Aug. 18, 1896 |
| 630,397 | Niedringhaus | Aug. 8, 1899 |
| 2,118,182 | Flint | May 24, 1938 |
| 2,127,994 | Davis et al. | Aug. 23, 1938 |
| 2,235,111 | Potoczsky | Mar. 18, 1941 |
| 2,235,222 | Lauterbach | Mar. 18, 1941 |